R. HALEY.
GLASS MOLD.
APPLICATION FILED APR. 7, 1916.

1,278,336.

Patented Sept. 10, 1918.
2 SHEETS—SHEET 1.

WITNESSES

INVENTOR

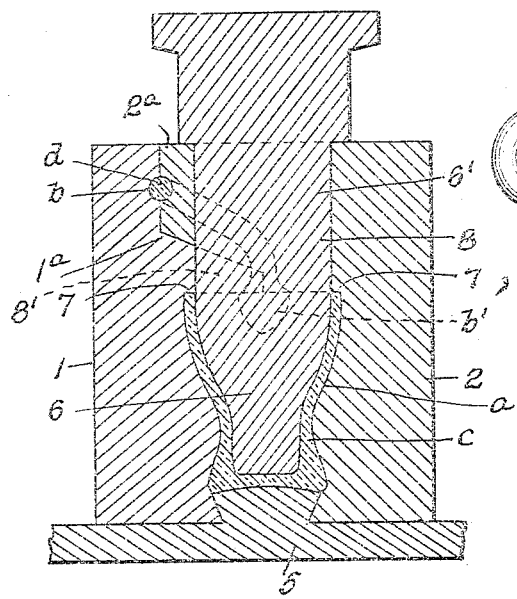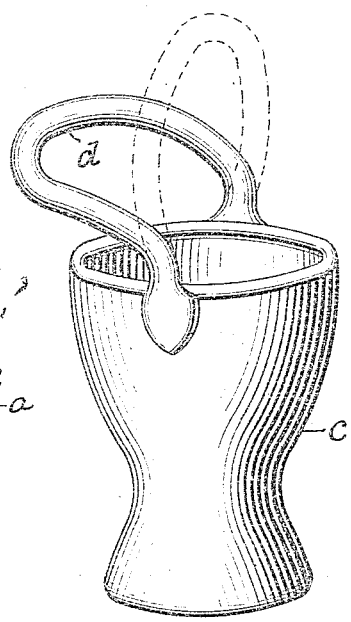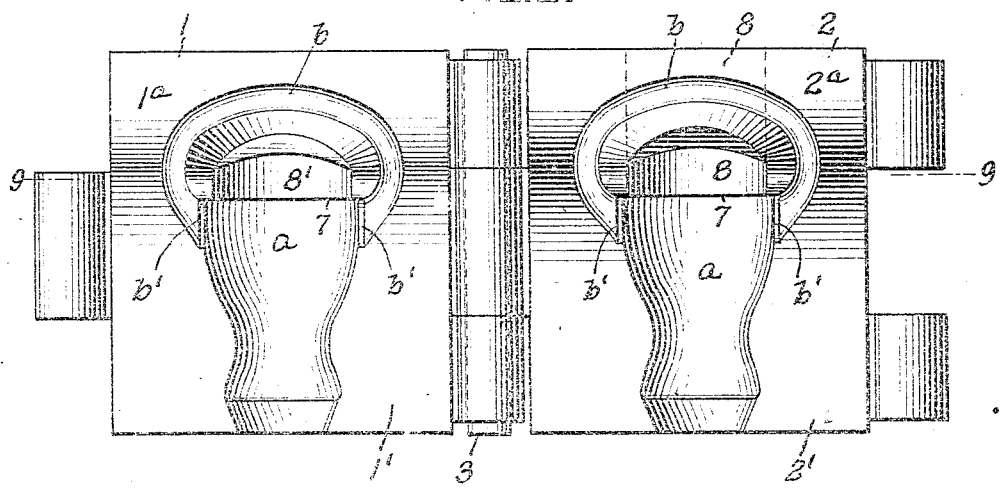

UNITED STATES PATENT OFFICE.

REUBEN HALEY, OF BEAVER, PENNSYLVANIA, ASSIGNOR TO UNITED STATES GLASS COMPANY, OF PITTSBURGH, PENNSYLVANIA, A CORPORATION OF PENNSYLVANIA.

GLASS-MOLD.

1,278,336.    Specification of Letters Patent.    Patented Sept. 10, 1918.

Application filed April 7, 1916.   Serial No. 89,602.

*To all whom it may concern:*

Be it known that I, REUBEN HALEY, a citizen of the United States, and resident of Beaver, in the county of Beaver and State of Pennsylvania, have invented certain new and useful Improvements in Glass-Molds, of which the following is a specification.

This invention relates to certain improvements in molds for the manufacture of glassware and the like; and the objects and nature of the invention will be readily understood by those skilled in the art in the light of the following explanation of the accompanying drawings illustrating what I now believe to be the preferred embodiment or mechanical expression of my invention from among other forms, arrangements and constructions within the spirit and scope thereof.

This invention relates to the production of glass bowls, vases, baskets or the like having upwardly extending or vertically disposed handles formed integral with the bowls or bodies of the articles and joined thereto at diametrically opposite points, such articles being pressed in molds so formed for the passage of the plunger that the article will leave the mold with its handle deflected laterally, the article being then reheated and its handle bent up to final upright position.

It is an object of my present invention to produce a mold for the production of such articles of glassware wherein the mold will form and provide the handle forming cavity without the necessity of providing a core or other separate element.

A further object of the invention is to provide certain improvements in formation and arrangement for the production of a simple and exceedingly advantageous mold for the production of handled glassware.

The invention consists in certain novel features in construction and in arrangement and formation as more particularly set forth and specified hereinafter.

Figure 1:
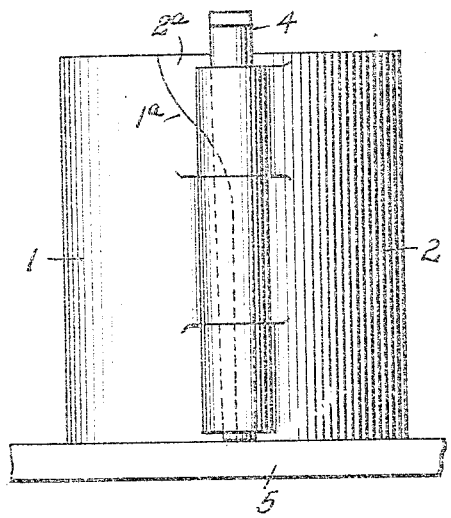
Figure 2:
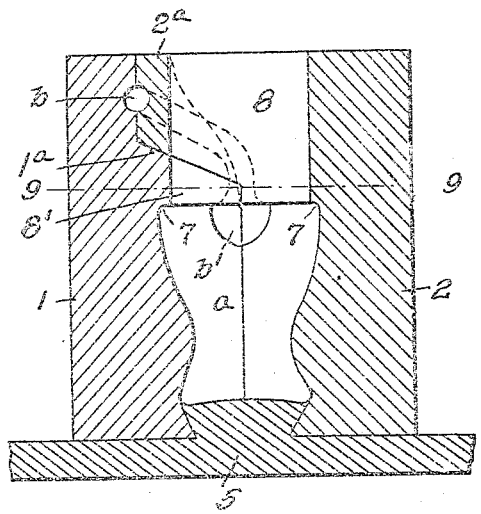
Figure 3:
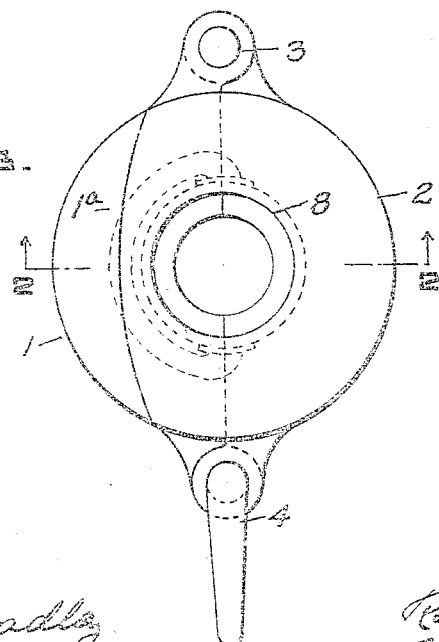

Referring to the accompanying drawings, Figure 1, is a side elevation of a mold embodying my invention. Fig. 2, is a vertical section taken in the plane of the line 2—2. Fig. 3. Fig. 3, is a top plan. Fig. 4, is a vertical section taken in the same plane as Fig. 2, and showing the plunger and the pressed or molded glass article. Fig. 5, is a perspective of a glass article produced by the mold, dotted lines showing the position of the handle after the article has been reheated and finally completed. Fig. 6, is an elevation of the opened mold showing the mold cavity forming sides of the mold sections.

In the particular example illustrated, the mold comprises a base 5, and two sections 1, 2, although I do not wish to limit my invention to any particular number of sections, and although I show these sections hinged together at 3, and provided with any suitable locking means 4, at their free ends, yet I do not wish to so limit the invention. These mold sections and the base provide a central vertical mold cavity $a$, for exteriorly shaping and forming the outer surface and top edge of the bowl or body of the glass article, while a central vertical plunger 6, is movable vertically through the upper portion of the mold and into said cavity to press the batch of molten glass therein to conform to the interior surfaces of said cavity, and to shape and produce the desired surface formation of the interior of the body or bowl of the glass article. The sections 1, 2, of the mold are peculiarly formed to provide a handle forming cavity $b$, at its opposite ends opening into diametrically opposite portions of the top of the mold cavity $a$, and this cavity $b$, is remote from the path traveled by the plunger and is formed by and between the meeting faces of the mold sections above the cavity $a$, and is so arranged that the molten glass under the pressure of the plunger is forcibly driven into the cavity $b$, to completely occupy the same and conform to the surface and shape thereof.

In the present embodiment, the top wall of the mold cavity $a$, is formed by a horizontal annular overhanging edge or shoulder 7, while the diametrically opposite ends $b'$, of the cavity $b$, open through the surrounding wall of cavity $a$, at the under side of the top wall 7, so that wall 7, overhangs the same. The cavity $b$, extends upwardly from said ends $b'$, for a short distance and is then offset laterally from the central longitudinal vertical plane of the mold.

The portion of the mold above the cavity $a$, is formed with a straight central vertical longitudinal bore 8, (usually cylindrical) at its upper end opening through the top of the mold and at its lower end opening centrally into the top of the cavity $a$, and the lower end of this bore is concentric with and is surrounded by the annular edge or shoulder 7. This bore is provided for the passage of the plunger to and from the cavity a, and guides and receives the cylindrical shank 6', of the plunger. In the example illustrated, where but two mold sections are employed, the cavity a, is formed by two similar correspondingly located depressions a, in the meeting or inner side faces 1', 2', of the mold sections 1, 2, and the mold is divided along a central vertical longitudinal plane to a horizontal plane 9, slightly above the horizontal plane of the annular edge or shoulder 7, to provide the sections 1, 2, with the parallel flat adjoining or inner sides 1', 2'.

Above this horizontal plane 9, the plane of division between said mold sections is inclined upwardly and laterally from the central vertical longitudinal plane and is then carried upwardly through the top of the mold to one side of and more or less remote from the bore 8. This division of the mold forms the portion of the mold section 1, above the horizontal plane 9, with a laterally reduced or recessed inner side face 1ª, and the corresponding portion of the mold section 2, with a corresponding laterally enlarged or overhanging side face 2ª, to occupy the reduced or deflected portion 1ª, of section 1.

The bore 8, extends down through and is entirely arranged within the laterally enlarged or overhanging upper portion of the mold section 2, except for the lower end thereof surrounded by the top edge wall 7, of cavity a, which is included in the central longitudinal portion of the division plane, so that the semi-cylindrical surface 8', of section 1, forms a portion of the lower end of bore 8, in the closed mold.

The handle cavity b, of the closed mold is formed by correspondingly formed and arranged grooves b, (Fig. 6) in the meeting surfaces of the offset sides 1ª, 2ª, of the mold sections, and the portions of said inner or meeting sides of the sections that are provided with said grooves are so formed by intermediate bulges and depressions that all portions of the horizontally and vertically curving channel or cavity b, formed by the meeting grooves will separate (when the mold sections swing apart) along the central vertical center thereof, so that each groove will receive one half of the glass handle from end to end thereof.

The formation of the mold sections is such that when closed together to provide the complete mold, the charge or batch of molten glass can be introduced through bore 8, into the bowl or body forming cavity a. The plunger is then caused to perform its operative pressing stroke down through bore 8, and into the cavity to properly shape the bowl or body c, of the glass article, Fig. 5, and to force or drive sufficient molten glass into channel or cavity b, to completely fill the same and form the laterally deflected loop-like handle d, of the glass article Fig. 5, integral with the bowl c, and formed from the same batch of glass as and by the same operation that forms said bowl. When thus formed, one vertical half of the bowl and handle of the glass article, will be located entirely within one mold section and the other half of the bowl and handle in the other section, while the shank of the plunger will be located approximately entirely within the mold section 2, while the pressing or shaping end thereof will be located half in one section and half in the other section along the central vertical longitudinal line of the mold.

The outer longitudinal edge of the handle will be within and formed by the mold section 1, while the inner longitudinal edge of the handle will be within and formed the mold section 2.

At the proper time, the plunger is withdrawn from the mold cavity a, and thereafter the mold is opened and the sections will completely separate horizontally from the bowl and handle, and the article can thereafter be reheated to permit bending of the handle to the upright position approximately as indicated by dotted lines, Fig. 5.

It will be observed that the handle forming channel or cavity is located entirely within the mold sections and formed by surfaces thereof without the provision of a separate core and yet the handle forming cavity is removed from the path traveled by the plunger and I am enabled to employ a plunger movable longitudinally of the mold and alined with the central longitudinal axis of the mold cavity a.

It is evident that various changes modifications and variations might be resorted to without departing from the spirit and scope of my invention and hence I do not wish to limit myself to the exact disclosure hereof.

What I claim is:—

1. A glass mold comprising a pair of longitudinal sections formed to meet at their inner sides to complete the mold, the inner sides of said sections having corresponding depressions arranged to form a glass body shaping cavity and shoulders to form the annular top edge wall of said cavity, the portions of the inner sides of said sections above said shoulders being correspondingly deflected laterally and formed at their meeting sides to provide the complete mold with a laterally deflected handle forming channel located at opposite ends opening into opposite sides of said cavity below said top edge wall, said mold having a bore for a pressing plunger opening into said cavity and partially surrounded by and remote from said channel.

2. A glass mold comprising a pair of longitudinal separable sections at their inner sides having corresponding depressions adapted to form a glass body shaping cavity when the sections are brought together, one of said sections being laterally reduced or recessed above its depression and the other section being correspondingly laterally offset or enlarged and having a bore therethrough and opening into said cavity to receive a pressing plunger, the inner sides of said laterally depressed and enlarged portions being relatively formed to provide the completed mold with an offset or laterally deflected handle forming channel separated from said bore and at its opposite ends opening into opposite sides of said cavity.

In testimony whereof, I affix my signature in presence of two witnesses.

REUBEN HALEY.

Witnesses:
W. H. FISHER,
W. F. JONES.